(12) United States Patent
Allen

(10) Patent No.: US 7,250,730 B1
(45) Date of Patent: Jul. 31, 2007

(54) UNIQUE LIGHTING STRING RECTIFICATION

(75) Inventor: David Allen, Yardley, PA (US)

(73) Assignee: Fiber Optic Designs, Inc., Yardley, PA (US)

( * ) Notice: Subject to any disclaimer, the term of this patent is extended or adjusted under 35 U.S.C. 154(b) by 0 days.

(21) Appl. No.: 11/332,281

(22) Filed: Jan. 17, 2006

(51) Int. Cl.
 *H05B 37/00* (2006.01)

(52) U.S. Cl. .............................. 315/185 R; 315/185 S; 315/201

(58) Field of Classification Search ............ 315/185 R, 315/186, 187, 188, 189, 193, 185 S, 200 R, 315/201; 362/227, 235, 251, 252
See application file for complete search history.

(56) References Cited

U.S. PATENT DOCUMENTS

| | | | |
|---|---|---|---|
| 3,758,771 A | 9/1973 | Frohardt et al. |
| 3,950,738 A | 4/1976 | Hayashi et al. |
| 4,223,248 A | 9/1980 | Tong |
| 4,271,408 A | 6/1981 | Teshima et al. |
| 4,298,869 A | 11/1981 | Okuno |
| 4,316,125 A | 2/1982 | Noguchi |
| 4,321,598 A | 3/1982 | Warner |
| 4,329,625 A | 5/1982 | Nishizawa et al. |
| 4,365,244 A | 12/1982 | Gillessen et al. |
| 4,367,471 A | 1/1983 | Gillessen |
| 4,396,823 A | 8/1983 | Nihei et al. |
| 4,420,251 A | 12/1983 | James et al. |
| 4,521,835 A | 6/1985 | Meggs et al. |
| 4,595,920 A | 6/1986 | Runyan |
| 4,652,981 A | 3/1987 | Glynn |
| 4,675,575 A | 6/1987 | Smith et al. |
| 4,727,603 A | 3/1988 | Howard |
| 4,753,546 A | 6/1988 | Witz et al. |
| 4,839,777 A | 6/1989 | Janko et al. |
| 4,843,280 A | 6/1989 | Lumbard et al. |
| 4,857,920 A | 8/1989 | Katoaoka et al. |
| 4,870,547 A | 9/1989 | Crucefix |
| 4,939,426 A | 7/1990 | Menard et al. |
| 4,954,822 A | 9/1990 | Borenstein |
| 4,959,766 A | 9/1990 | Jain |
| 4,984,999 A | 1/1991 | Leake |

(Continued)

FOREIGN PATENT DOCUMENTS

CA 1118394 2/1982

(Continued)

OTHER PUBLICATIONS

ALDERBROOK Industries Ltd., 1998 Sales Catalogue, p. 16.
Pages from Canadian Tourism Commission web-site, www.travelcanada.ca.

(Continued)

*Primary Examiner*—Thuy Vinh Tran
(74) *Attorney, Agent, or Firm*—Berenato, White & Stavish

(57) ABSTRACT

An improved decorative light string circuit comprises full bridge rectification located in or downstream of the front plug, wherein the rectification circuit contains one or more voltage reducing and/or filtering elements in order to reduce or limit LED drive current and reduce (filter) DC ripple and 1 or 2 LED series sets. Additional rectification circuits and LED series sets can be added in parallel to the first in "stacked mode", with each rectification circuit and LED series set electrically independent of prior and subsequent circuits. This eliminates the rectifying diode current summation load restrictions imposed by prior art and associated safety hazard due to diode overheating.

13 Claims, 4 Drawing Sheets

U.S. PATENT DOCUMENTS

| | | | |
|---|---|---|---|
| 5,027,037 A | 6/1991 | Wei | |
| 5,087,212 A | 2/1992 | Hanami | |
| 5,094,632 A | 3/1992 | Chen et al. | |
| 5,130,897 A | 7/1992 | Kuzma | |
| 5,155,669 A | 10/1992 | Yamuro | |
| 5,187,377 A | 2/1993 | Katoh | |
| 5,193,895 A | 3/1993 | Naruke et al. | |
| 5,257,020 A | 10/1993 | Morse | |
| 5,313,187 A | 5/1994 | Choi et al. | |
| 5,323,305 A | 6/1994 | Ikeda et al. | |
| 5,357,078 A | 10/1994 | Smith et al. | |
| 5,366,780 A | 11/1994 | Rapisarda | |
| 5,404,282 A | 4/1995 | Klinke et al. | |
| 5,410,458 A | 4/1995 | Bell | |
| 5,436,809 A | 7/1995 | Brassier et al. | |
| 5,457,450 A | 10/1995 | Deese et al. | |
| 5,463,280 A | 10/1995 | Johnson | |
| 5,495,147 A | 2/1996 | Lanzisera | |
| 5,504,398 A | 4/1996 | Rothenbuhler | |
| 5,528,484 A | 6/1996 | Hayashi | |
| 5,567,037 A | 10/1996 | Ferber | |
| 5,639,157 A | 6/1997 | Yeh | |
| 5,649,755 A | 7/1997 | Rapisarda | |
| 5,661,645 A | 8/1997 | Hochstein | |
| 5,663,719 A | 9/1997 | Deese et al. | |
| 5,669,703 A | 9/1997 | Wheeler et al. | |
| 5,726,535 A | 3/1998 | Yan | |
| 5,762,419 A | 6/1998 | Yan | |
| 5,806,965 A | 9/1998 | Deese | |
| 5,808,592 A | 9/1998 | Mizutani et al. | |
| 5,828,183 A | 10/1998 | Wang et al. | |
| 5,887,967 A | 3/1999 | Chang | |
| 5,920,827 A | 7/1999 | Baer et al. | |
| 5,924,784 A | 7/1999 | Chliwnyj et al. | |
| 5,936,599 A | 8/1999 | Reymond | |
| 5,941,626 A | 8/1999 | Yamuro | |
| 5,962,971 A | 10/1999 | Chen | |
| 5,988,831 A | 11/1999 | Pan | |
| 6,072,280 A | 6/2000 | Allen | |
| 6,183,310 B1 | 2/2001 | Shu | |
| 6,190,021 B1 | 2/2001 | Huang | |
| 6,200,003 B1 | 3/2001 | Tseng | |
| 6,261,019 B1 | 7/2001 | Furukawa | |
| 6,344,716 B1 * | 2/2002 | Gibboney, Jr. | 315/185 S |
| 6,361,198 B1 | 3/2002 | Reed | |
| 6,461,019 B1 * | 10/2002 | Allen | 362/249 |
| 6,505,954 B2 | 1/2003 | Chen | |
| 6,641,294 B2 * | 11/2003 | Lefebvre | 362/544 |
| 6,830,358 B2 * | 12/2004 | Allen | 362/640 |
| 6,972,528 B2 * | 12/2005 | Shao | 315/185 R |
| 2002/0145874 A1 | 10/2002 | Kahl | |
| 2002/0149938 A1 | 10/2002 | Allen | |
| 2002/0191393 A1 | 12/2002 | Chen | |
| 2003/0015968 A1 | 1/2003 | Allen | |
| 2003/0147245 A1 | 8/2003 | Chen | |
| 2004/0201988 A1 * | 10/2004 | Allen | 362/249 |
| 2005/0168156 A1 | 8/2005 | Li et al. | |

FOREIGN PATENT DOCUMENTS

| | | |
|---|---|---|
| EP | 0 805 304 A2 | 11/1997 |
| GB | 2264555 | 9/1993 |
| JP | A 58-119682 | 7/1983 |
| JP | A 3-273495 | 12/1991 |
| WO | WO 00/13469 | 3/2000 |

OTHER PUBLICATIONS

Pages from www.kropfa.com web site "MicroElectronics Circuits", Third Edition, Sendra & Smith, Saunders College Publishing, 1991, pp. 126-128, and Exercise 3.12 on pp. 136-137.

"Optoelectronics/Fiber-Optics Applications Manual", Second Edition, McGraw-Hill Book Company, 1981, pp. 2.18-2.19. Copy of a Canadian Standards Association Approval Form, dated Jun. 5, 1998.

* cited by examiner

UNIQUE LIGHTING STRING RECTIFICATION

FIELD OF THE INVENTION

The present invention relates to the field of decorative LED light strings and particularly an improved circuit to be used to connect LED light strings having one or more series connection.

BACKGROUND

LEDs are becoming increasingly popular as a light source in decorative and Christmas lights due to their reliability, energy savings, longevity, and cool operation. Manufacturers of decorative light strings are constantly working to maximize the brightness and benefits of LEDs as a light source as well as reduce production cost to narrow the gap between traditional, incandescent and LED light string cost.

It is known in the art the use of a DC power supply to power LED lamps maximize LED brightness and longevity. However, prior art discloses the use of a full bridge rectification circuit that requires additional conductor wires, separate enclosures to house rectifying diodes and/or additional conductor connections and/or voltage and current reducing devices, and places undue current load on rectifying diodes, detracting from the appearance of the light string and creating a potential safety hazard.

FIG. 1 shows a prior art embodiment of an LED light string comprising a light string requiring 4 conductor wires when a single series block of LED lamps and an end connector is employed. Five (5) conductor wires are required when two or more series blocks of LED lamps are employed. Both the AC to DC converter and additional wires imposed by this design add significant cost and detract from the aesthetics of the light string.

FIGS. 2A and 2B also show prior art embodiments of LED light strings. The prominent feature of these prior arts is circuit rectification wherein the rectifying diodes are installed in split pairs in an attempt to save wire, thus reducing cost. However according to the embodiment of FIG. 2A of the invention, three (3) conductor wires and a "dummy plug" is required when the light string does not have an end connector. In addition, significant modifications, enlarging the plug and/or end connector would be required in order to house the split pairs of rectifying diodes and voltage reducing devices. Alternately, the split diode pairs and voltage reducing devices would require a fairly large, separate enclosure to house them. Both of these options add significant cost and detract from the aesthetics of the light string.

According to the embodiment of FIG. 2B of this invention the number of conductor wires required in the manufacture of the light chain increases one-for-one with each parallel connected series block of LEDs added to the lighting chain. Thus, a light string employing 2 series blocks of LED lamps requires 4 conductor wires (3 series blocks require 5 conductor wires, etc.). An even larger enclosure is required in order to house the diode pairs, multiple conductor wires, and voltage reducing devices; Thus the invention disclosed defeats the wire saving purpose, adds cost, places severe limitations on the design, complicates the manufacturing process, and further detracts from the aesthetics of the light string.

In addition, both of the light string designs shown in FIG. 1 and FIGS. 2A and 2B create a safety hazard when additional series blocks of LED lamps are employed. The AC to DC converter (rectifying diodes) will quickly overheat due to the increased electrical load (current summation) imposed by the additional parallel connected series blocks of LED lamps. Accordingly, both of these designs have severe limitations.

SUMMARY OF THE INVENTION

In view of the disadvantages of the prior art, the object of the present invention is to provide an improved decorative light string circuit that can solve the problems mentioned previously.

To attain the aforesaid object, the present invention comprises a common decorative light string current tap or plug, a common end connector, full bridge rectification consisting of 4 rectifying diodes and at least 1 block of series connected LED lamps. Individual rectifying diodes form electrical connections between parallel and series conductors at various points within the light string. Said individual rectifying diodes can be distributed and housed among the light string plug, end connector, decorative light string lamp husks, or attached directly to the LED electrical contacts or conductor wires (or any combination thereof), simplifying the manufacturing process and rendering them invisible and thus eliminating the manufacture, enclosing, and electrically insulating of the 4 diode set and multiple conductor connections required of prior art FIG. 1, and the split pairs of rectifying diodes and/or current and voltage control devices and multiple conductor connections required of prior art FIGS. 2A and 2B.

Additional LED series sets can be added in parallel to the first using traditional series/parallel light string construction and assembly methods. This eliminates the rectifying diode current summation load restrictions imposed by prior art and associated safety hazard due to diode overheating and further simplifies the light string manufacturing process.

In addition, since each bridge and LED series circuit is electrically independent parallel connected series blocks of LEDs can have varying number of serially connected LEDs within the same light string. For example series block #1 could have 75 LED lamps in series with parallel connected series block #2 having only 25 LED lamps in series and parallel connected series block #3 having 50 LED lamps in series.

Manufacturing cost is significantly reduced and light string appearance improved as the number of conductor wires does not increase as the number of LED series blocks connected in parallel increases. The prior art shown in FIG. 1 requires 5 conductor wires when multiple series blocks of LED lamps are connected in parallel. Prior art shown in FIG. 2B requires 1 additional conductor wire for each parallel connected series block of LED lamps. The present invention requires only 3 conductor wires regardless of the number of parallel connections employed.

This invention, as well as its advantages will become apparent to one of ordinary skill in the art upon review of the included description and figures.

BRIEF DESCRIPTIONS OF THE DRAWINGS

DETAILED DESCRIPTION OF THE PREFERRED EMBODIMENT

Figure 1:
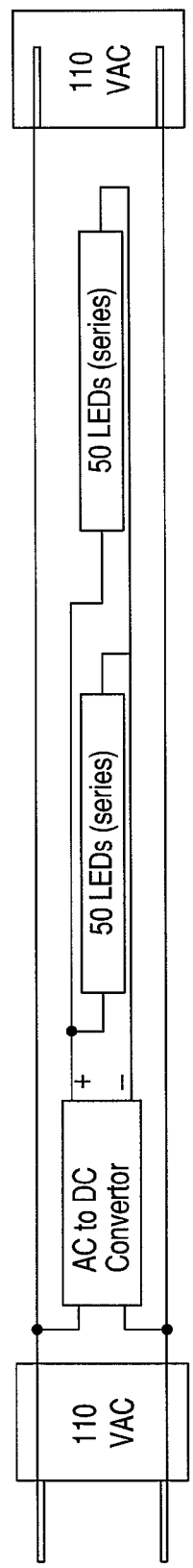
FIG. 1 is a prior art schematic circuit diagram of a decorative light string.
Figure 2A:
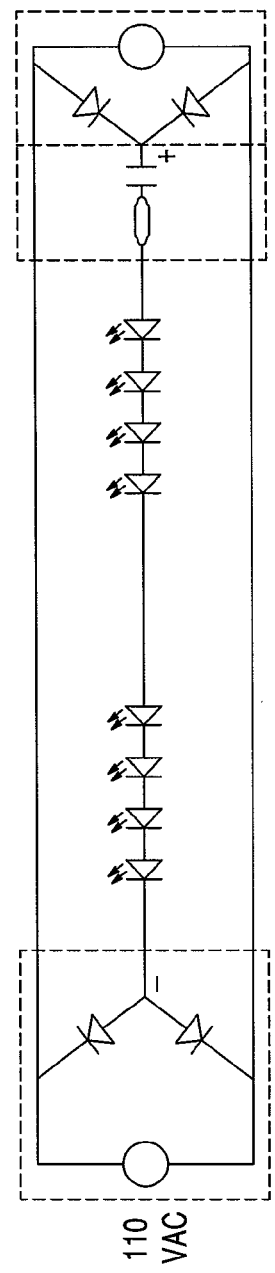
FIGS. 2A and 2B are prior art schematic circuit diagrams of decorative light strings.
Figure 2B:
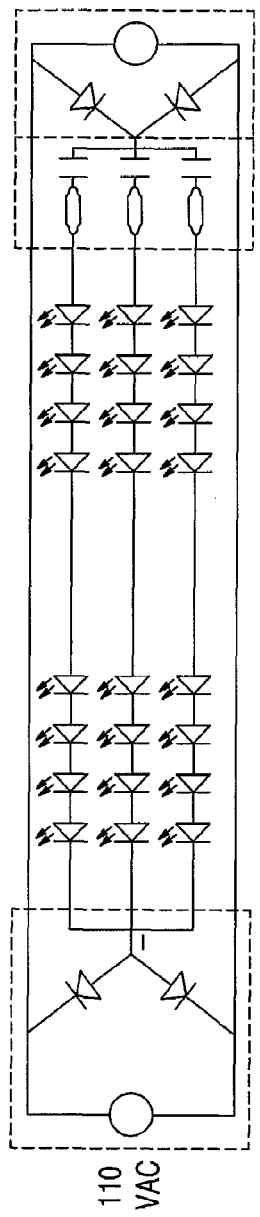

Reference will now be made to the exemplary embodiments illustrated in the drawings, and specific language will be used herein to describe the same.

Figure 3A:
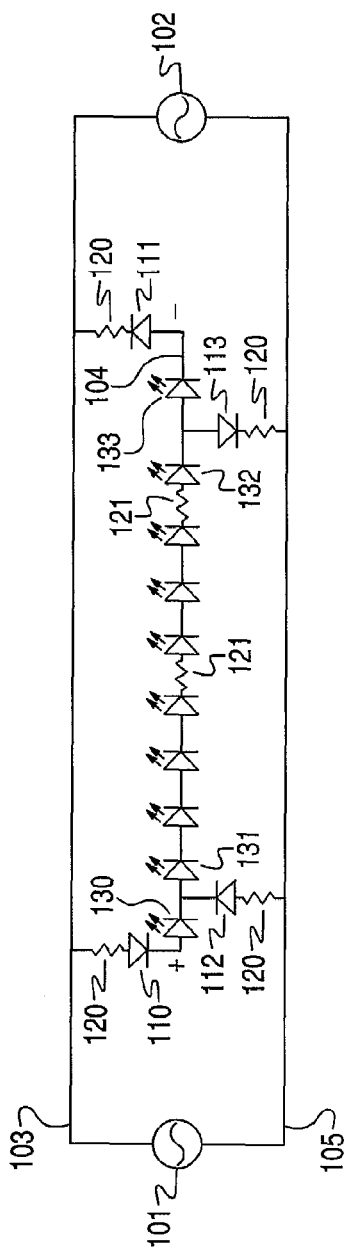
FIGS. 3A and 3B is schematic circuit diagrams of this invention
Figure 3B:
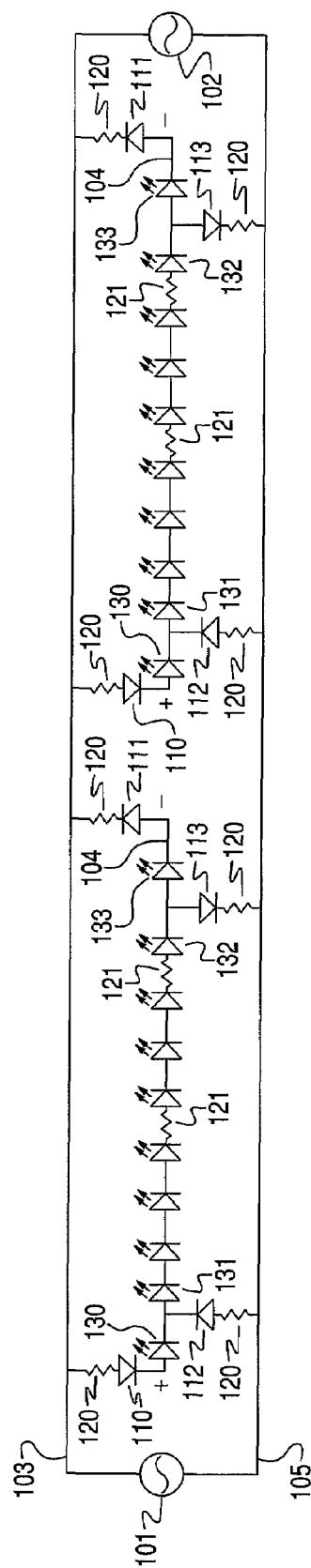

As shown in FIGS. 3A and 3B, the LED light string includes a common household AC input voltage source and AC plug (101), parallel conductor wires (103 and 105), series conductor wire (104), a plurality of LED lamps, and end connector plug (102) incorporating exit AC voltage for powering additional light strings.

First rectifying diode (110) forms an electrical connection between parallel conductor wire (103) via optional resistor (120) and the positive terminal of first light emitting diode (130). Subsequent light emitting diodes are electrically connected in series via series conductor wire (104) through last series connected light emitting diode (133). Second rectifying diode (111) forms an electrical connection between the negative terminal of last light emitting diode (133) and parallel conductor wire (103) via optional resistor (120), thus giving half wave rectification to the partially completed circuit.

Third rectifying diode (112) forms an electrical connection between parallel conductor wire (105) via optional resistor (120) and the negative terminal of second series connected light emitting diode (131). Fourth rectifying diode (113) forms an electrical connection between the negative terminal of next to last series connected light emitting diode (132) and parallel conductor wire (105) via optional resistor (120), thus completing the circuit and providing full bridge rectification.

Optional series resistors (121) can be added in order to drive the serially connected LED lamps at the desired current. A varistor, capacitor, current saturated transistor, current limiting diode (CLD) or other impedance device can be substituted for one or more of resistors (120 and 121).

As shown in FIG. 3B, additional series blocks of LED lamps can be connected in parallel with each additional series block operating electrically independent of prior and subsequent series blocks of LED lamps.

Figure 4A:
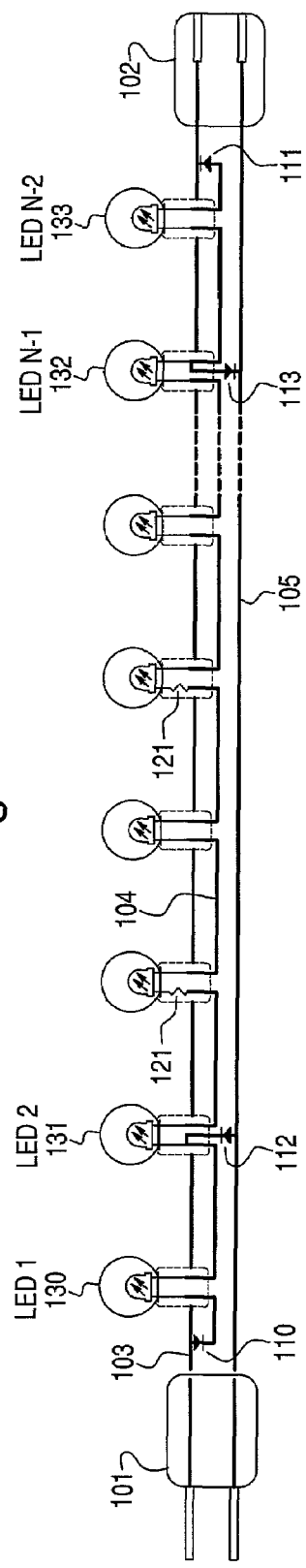
FIGS. 4A-4C illustrates a physical embodiment of the circuit diagram shown in FIGS. 3A and 3B.
Figure 4B:
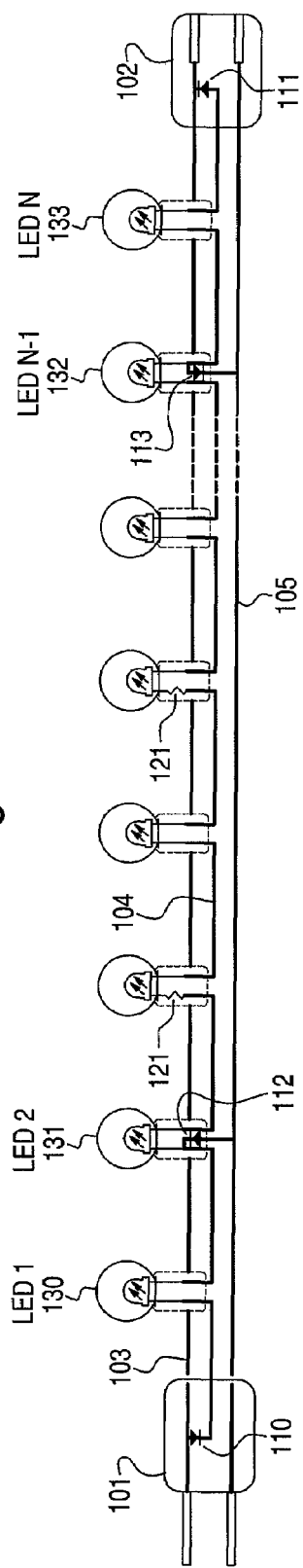
Figure 4C:
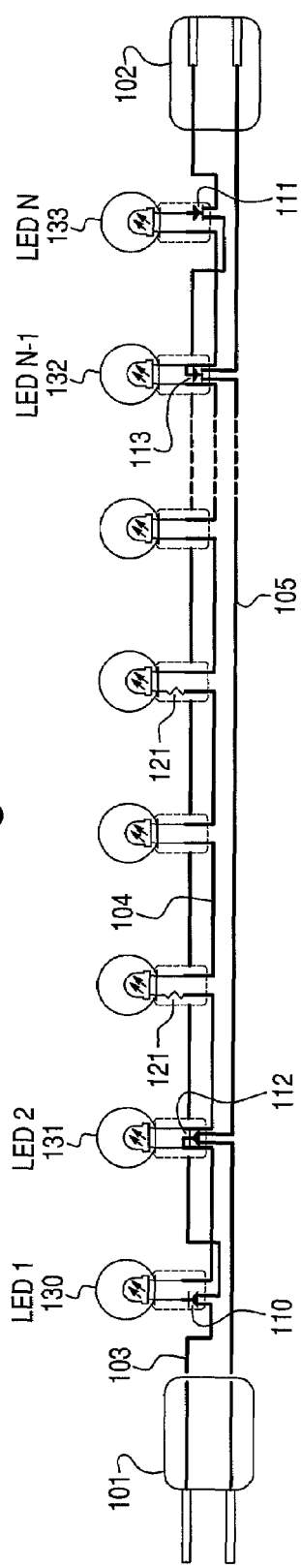

A physical embodiment of the circuit diagram shown in FIGS. 3A and 3B is illustrated in FIGS. 4A-4C with main components numbered accordingly.

FIG. 4A illustrates rectifying diodes (110, 111, 112, and 113) connected directly to parallel conductor wires (103 and 105) respectively.

FIG. 4B illustrates one each of the rectifying diodes contained inside the conventional AC plug and end connector and one each of the rectifying diodes connected directly to the respective LED lamp and contained inside the conventional, plastic light string lamp husk. Alternately, all four rectifying diodes can be housed within the plug and cord connected and connected to the respective LED lamps in the manner shown.

FIG. 4C illustrates one each of the rectifying diodes connected directly to the respective LED lamp and contained inside the conventional, plastic light string husk.

These figures are not meant to be all inclusive and are provided to illustrate to light string manufacturers how all or partial individual rectifying diodes can be incorporated within or attached to standard, commonly used lighting string components without alteration or modification of the components, or requiring fabrication of additional enclosures, thus allowing manufacturers to follow the assembly process traditionally practiced by the decorative lighting industry.

Naturally, the polarity of components and series connected LEDs can be reversed. Positive DC connections were illustrated first for consistency of illustration only.

It is to be understood that the above-referenced arrangements are illustrative of the application of the principles of the present invention. It will be apparent to those of ordinary skill in the art that numerous modifications can be made without departing from the principles and concepts of the invention as set forth in the following claims:

The invention claimed is:

1. An LED light string comprising:
an AC input voltage input having a positive terminal and a negative terminal;
parallel conductor wires electrically connected to the positive and negative terminals of the AC voltage input;
a first rectification and control circuit defines a full wave rectifier comprising four rectifying diodes electrically connected to the parallel conductor wires;
a series conductor wire electrically connected to ends of each of said four rectifying diodes of said first rectification and control circuit, said ends of each of said four rectifying diodes being connected at discrete locations along said series conductor wire to provide full wave rectification;
a plurality of series connected LED lamps electrically connected by said series conductor wire.

2. The LED light string according to claim 1, further comprising a series resistance is series with said series conductor wire.

3. The LED light string according to claim 1, further comprising one of a varistor, capacitor, current saturated transistor, current limiting diode (CLD) or other impedance device in series with said series conductor wire.

4. The LED light string according to claim 1, further comprising a rear rectification and control circuit comprising four rectifying diodes electrically connected to the parallel conductor wires.

5. The LED light string according to claim 1, wherein said AC voltage input comprises a front end connector plug.

6. The LED light string according to claim 4, further comprising an end connector plug.

7. The LED light string according to claim 6, wherein said series resistance, rear rectification and control circuit, and said end connector plug incorporating exit AC voltage for powering additional light strings.

8. The LED light string according to claim 1, wherein said first rectification and control circuit draws AC input voltage from said parallel conductor wires via at least one resistor in order to reduce DC output voltage.

9. The LED light string according to claim 1, wherein a positive DC output terminal of said first rectification and control circuit provides positive DC power to said series conductor wires containing said plurality of serially connected LED lamps.

10. The LED light string according to claim 1, wherein said series conductor wire returns to a negative DC terminal of said first rectification and control circuit.

11. The LED light string according to claim 1, wherein said series conductor wire returns to a negative DC terminal of an additional rectification circuit comprising a plurality of diodes.

12. The LED light string according to claim 1, further comprising at least one accessory electrically connected to DC terminals of said first rectification and control circuit.

13. The LED light string according to claim 1, further comprising a parallel series block of LED lamps electrically connected to DC terminals of said first rectification and control circuit.

* * * * *